US010428860B2

(12) United States Patent
Dobbin et al.

(10) Patent No.: US 10,428,860 B2
(45) Date of Patent: Oct. 1, 2019

(54) SELF-SEALING FIXING ELEMENT

(71) Applicant: AIRBUS OPERATIONS LIMITED, Bristol (GB)

(72) Inventors: Richard Dobbin, Bristol (GB); Mark Scarrott, Hamburg (DE)

(73) Assignee: AIRBUS OPERATIONS LIMITED, Bristol (GB)

( * ) Notice: Subject to any disclaimer, the term of this patent is extended or adjusted under 35 U.S.C. 154(b) by 640 days.

(21) Appl. No.: 15/068,712

(22) Filed: Mar. 14, 2016

(65) Prior Publication Data
US 2016/0273572 A1  Sep. 22, 2016

(30) Foreign Application Priority Data
Mar. 18, 2015  (GB) .................... 1504591.7

(51) Int. Cl.
*F16B 33/00* (2006.01)
*F16B 39/02* (2006.01)
*F16B 43/00* (2006.01)
*B64D 45/02* (2006.01)

(52) U.S. Cl.
CPC ............ *F16B 39/021* (2013.01); *B64D 45/02* (2013.01); *F16B 33/004* (2013.01); *F16B 43/001* (2013.01)

(58) Field of Classification Search
CPC ...... B64D 45/02; F16B 33/004; F16B 33/001; F16B 23/00; F16B 35/04; F16B 35/041; F16B 36/042; F16B 2037/007; F16B 23/0069; F16B 35/06; F16B 23/007; F16B 5/0283

USPC ........... 411/82.2, 371.1, 82.3, 366.1, 395, 34
See application file for complete search history.

(56) References Cited

U.S. PATENT DOCUMENTS 2,943,661 A * 7/1960 Stern .................. F16B 5/128
277/640
3,148,901 A 9/1964 Campbell
3,203,459 A * 8/1965 Coldren .................. F16B 39/34
411/260

(Continued)

FOREIGN PATENT DOCUMENTS

DE 102008039701 A1 3/2010
EP 2072837 A2 6/2009
(Continued)

OTHER PUBLICATIONS

European Search Report dated Jul. 26, 2016 EP Application No. 16159272.
(Continued)

*Primary Examiner* — Gary W Estremsky
(74) *Attorney, Agent, or Firm* — Nixon & Vanderhye P.C.

(57) ABSTRACT

A self-sealing fixing element is disclosed having a body with a bearing surface, and a bore with an opening in the bearing surface. A curable sealant layer is carried by the bearing surface and encircles the opening in the bearing surface. The curable sealant layer is formed from a sealant material which cures when exposed to atmosphere. A barrier layer overlays the curable sealant layer and can break apart when the fixing element is installed in order to expose the sealant layer to atmosphere. The curable sealant layer has a thickness which decreases away from the bore, and the barrier layer has a thickness which increases away from the bore.

27 Claims, 12 Drawing Sheets

(56) References Cited

U.S. PATENT DOCUMENTS

| | | | | |
|---|---|---|---|---|
| 3,316,952 | A * | 5/1967 | Hollinger | F16B 33/004 285/212 |
| 3,469,490 | A * | 9/1969 | Pearce, Jr. | F16B 33/004 403/288 |
| 3,606,357 | A * | 9/1971 | Yonkers | F16B 43/001 277/637 |
| 3,622,167 | A * | 11/1971 | Velthoven | F16B 39/24 277/630 |
| 3,627,334 | A * | 12/1971 | Reddy | F16B 43/001 277/637 |
| 3,711,347 | A | 1/1973 | Wagner et al. | |
| 4,384,730 | A | 5/1983 | Diehl | |
| 4,755,904 | A | 7/1988 | Brick | |
| 5,388,941 | A * | 2/1995 | Wuenscher | B62D 5/061 411/303 |
| 5,454,675 | A * | 10/1995 | DeHaitre | F16B 33/004 411/303 |
| 6,006,610 | A | 12/1999 | Lehnert | |
| 6,244,807 | B1 * | 6/2001 | Garcia | F16B 33/004 411/369 |
| 6,283,691 | B1 * | 9/2001 | Bogatz | F16B 33/004 411/371.1 |
| 7,059,612 | B2 * | 6/2006 | Kuribayashi | F16B 43/001 277/637 |
| 7,800,884 | B2 | 9/2010 | Hernandez | |
| 8,092,128 | B1 * | 1/2012 | Bray | F16B 19/008 411/82 |
| 2009/0128983 | A1 | 5/2009 | Hernandez | |
| 2009/0145078 | A1 | 6/2009 | Herb | |
| 2010/0221064 | A1 | 9/2010 | West et al. | |
| 2011/0127771 | A1 | 6/2011 | Panusa | |
| 2015/0086143 | A1 | 3/2015 | Wilson et al. | |

FOREIGN PATENT DOCUMENTS

| | | |
|---|---|---|
| GB | 1009682 A | 11/1965 |
| GB | 1277704 A | 6/1972 |
| GB | 2107005 A | 4/1983 |
| GB | 2233406 A | 1/1991 |
| WO | 2009053734 A1 | 4/2009 |
| WO | 2009063063 A1 | 5/2009 |
| WO | 2011063506 A1 | 6/2011 |
| WO | 2013164580 A1 | 11/2013 |

OTHER PUBLICATIONS

UKIPO Search Report dated Apr. 21, 2016 GB Application No. 1504591.7.

UKIPO Search Report dated Apr. 25, 2016 GB Application No. 1504591.7.

* cited by examiner

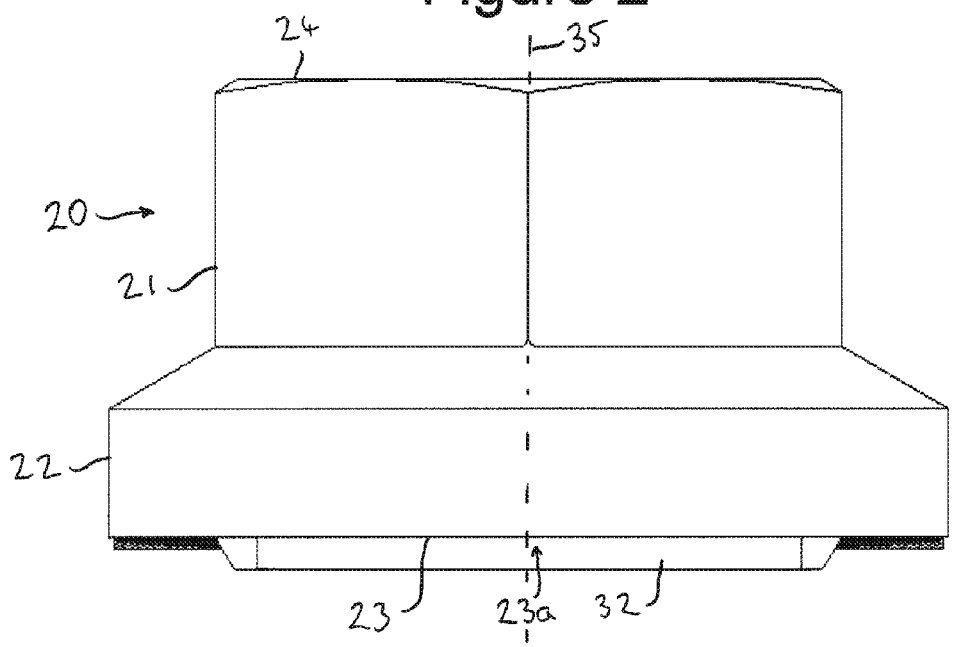
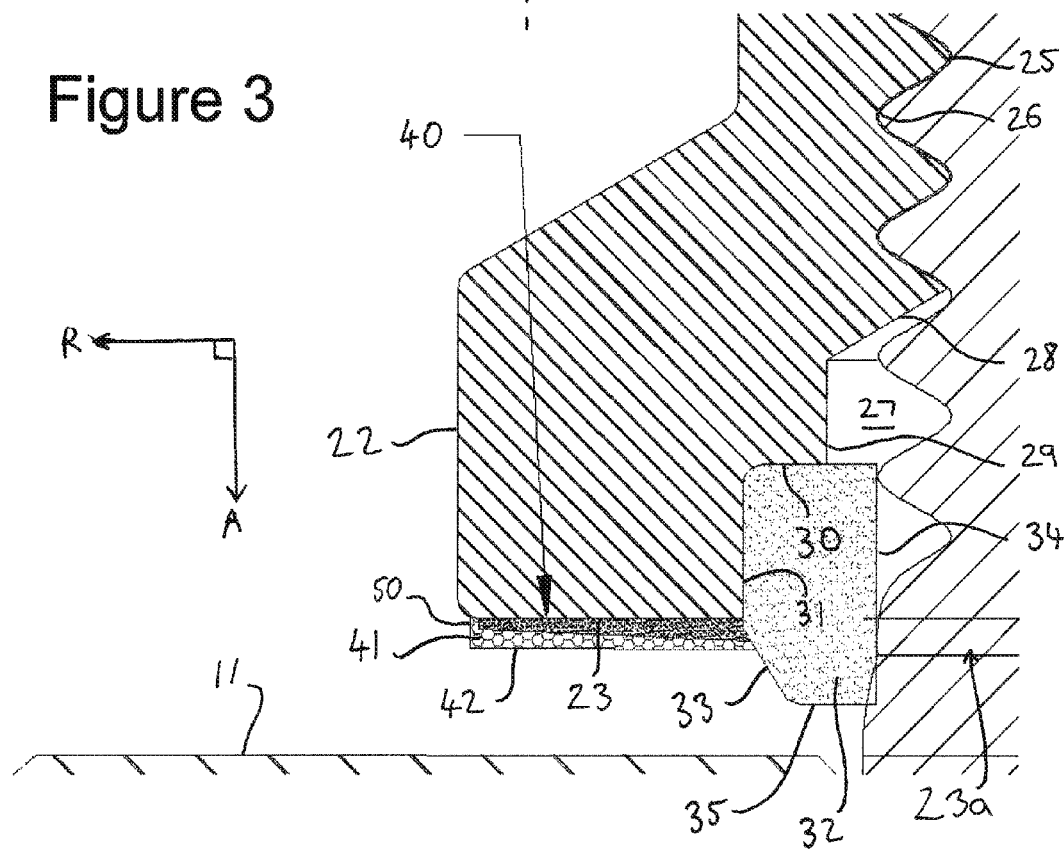

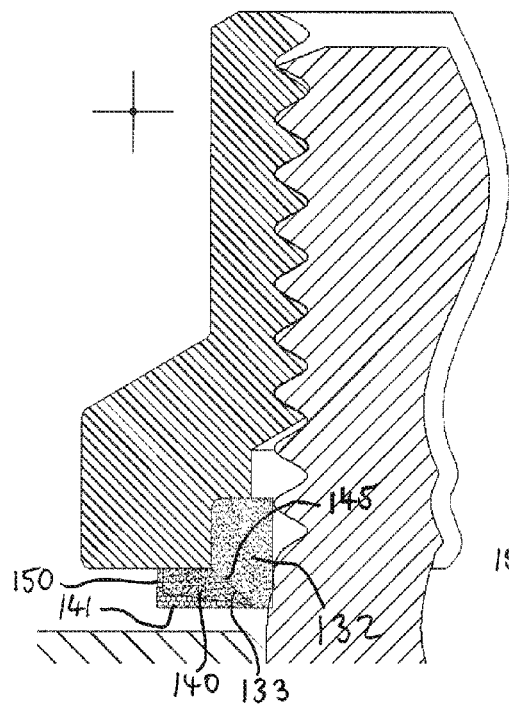
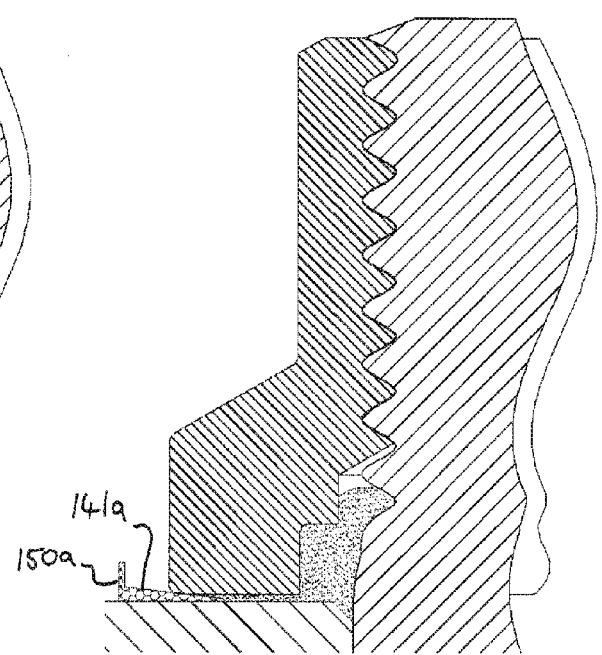
Figure 6  Figure 7
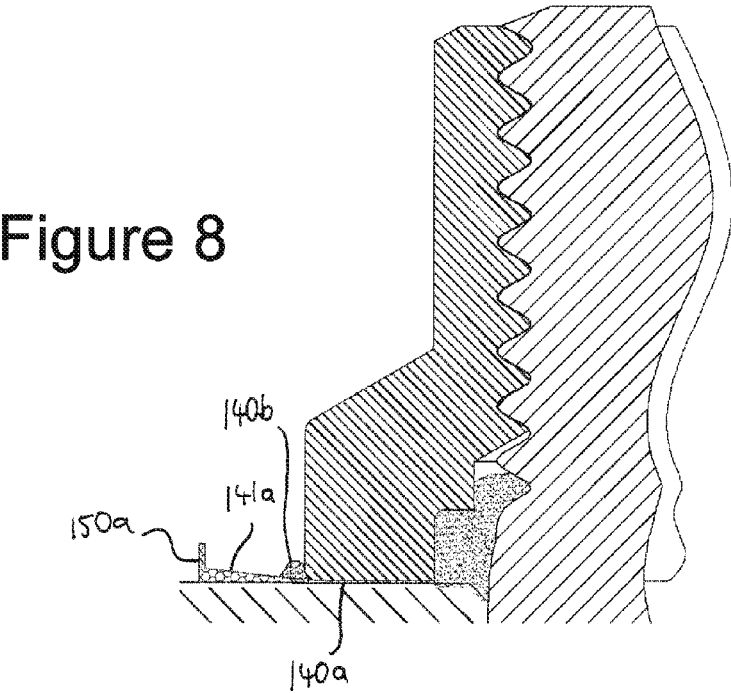
Figure 8

SELF-SEALING FIXING ELEMENT

RELATED APPLICATIONS

The present application claims priority from Great Britain Application Number 1504591.7, filed Mar. 18, 2015, the disclosure of which is hereby incorporated by reference herein in its entirety.

FIELD OF THE INVENTION

The present invention relates to a self-sealing fixing element such as a nut or swage collar.

BACKGROUND OF THE INVENTION

Current lightning strike protection requirements for fasteners on metallic aircraft stipulate two independent protection measures against possible ignition sources in the tank. Conventionally one protection measure is provided by an insulating anodising/paint layer on the structure, and the other protection measure is to encapsulate the fastener with an over-sealant.

U.S. Pat. No. 7,800,884 describes a device for the protection against electrical discharges of a conductive fixing element of an aircraft, comprising a cap made of non-conductive material and a washer made of non-conductive material insulating the fixing element from electrical discharges.

U.S. Pat. No. 8,092,128 describes a fastener suitable for use in airplane manufacture or repair that is coated with a pre-mixed moisture cure sealant. The sealant layer is coated with a frangible moisture barrier that will break apart when the fastener is installed, thus exposing the sealant to atmospheric moisture. Once exposed to moisture, the sealant will begin to cure.

SUMMARY OF THE INVENTION

A first aspect of the invention provides a self-sealing fixing element comprising a body with a bearing surface, and a bore with an opening in the bearing surface; a curable sealant layer which is carried by the bearing surface and encircles the opening in the bearing surface, wherein the curable sealant layer is formed from a sealant material which cures when exposed to atmosphere; and a barrier layer which overlays the curable sealant layer and can slide off the sealant layer (optionally after breaking apart) when the fixing element is installed in order to expose the sealant layer to atmosphere, wherein the curable sealant layer has a thickness which decreases away from the bore, and the barrier layer has a thickness which increases away from the bore.

The fixing element may be provided on its own, as an element of a self-sealing fastener assembly, or as an element of a kit of parts which can be assembled to form such a self-sealing fastener assembly. The assembly typically comprises a bolt with a head, and a shank extending from the head; and the self-sealing fixing element is fitted to the bolt with the shank in the bore.

The first aspect of the invention also provides a method of installing a self-sealing fastener assembly, the method comprising providing a kit of parts as described above; passing the shank through a structure; fitting the self-sealing fixing element to the bolt with the shank in the bore; urging the bearing surface towards the structure so that the barrier layer and the curable sealant layer are compressed between the bearing surface and the structure, the barrier layer slides off the sealant layer and is ejected away from the bore, and the curable sealant layer flows and then cures to form a seal between the bearing surface and the structure.

The barrier layer and the curable sealant layer have a combined thickness which may vary, or which may remain substantially constant in the radial direction away from the bore.

The fixing element may be any element which can be fitted to the shank of a bolt to secure the bolt to a structure with the bearing surface applying a clamping force to the structure. For instance the fixing element may be a nut or a swage collar. If the fixing element is a nut, then the bore typically has a threaded bore wall. If the fixing element is a swage collar, then the bore wall may be threaded or grooved, or it may have no threads or grooves.

Typically a deformable sealing ring is fitted into the bore, and the sealing ring is formed of a deformable material which can deform to form a seal with a shank when the fixing element is installed. Optionally the bore is formed with a recess (such as a counterbore) at the opening in the bearing surface, and the sealing ring is fitted into the recess.

Optionally the sealing ring contacts an inner edge of the barrier layer and/or is bonded to an inner edge of the barrier layer.

Optionally the sealing ring contacts an inner edge of the curable sealant layer.

Optionally the bore runs along an axis, and the sealing ring bears against an inner edge of the sealant layer which runs at an oblique angle to the axis. The sealing ring may have a chamfered edge which bears against the inner edge of the sealant layer, wherein the chamfered edge also runs at an oblique angle to the axis.

The bore may be a blind bore or it may be open at both ends.

The sealant material which cures when exposed to atmosphere may cure by reacting with atmospheric moisture, or by some other curing mechanism.

In one embodiment of the first aspect of the invention the barrier layer is formed as a coating of frangible material, so that it fractures into fragments as it is compressed between the bearing surface and the structure. In another embodiment the barrier layer is formed as two or more segments which can slide off the sealant layer without first fracturing into fragments—in this case the segments may be made from a non-frangible material.

A second aspect of the invention provides a self-sealing fixing element comprising: a body with a bearing surface, and a bore with an opening in the bearing surface; and a fitting comprising a washer which contacts the bearing surface and encircles the opening in the bearing surface, wherein the washer is formed of an insulating material which electrically isolates the bearing surface, and a deformable sealing flange which protrudes into the bore from an inner diameter of the washer, wherein the sealing flange is formed of a deformable material which can deform to form a seal.

The fixing element of the second aspect may be provided on its own, as an element of a self-sealing fastener assembly, or as an element of a kit of parts which can be assembled to form such a self-sealing fastener assembly. The assembly typically comprises a bolt with a head, and a shank extending from the head; and the self-sealing fixing element is fitted to the bolt with the shank in the bore.

Furthermore, the fixing element of the second aspect may be provided with the fitting installed on the body, or it may be provided as a kit of parts.

Optionally the fixing element is assembled by forming the washer and sealing flange as a single part to form the fitting; and then mounting the fitting to the body by pushing the sealing flange into the bore until the washer contacts the bearing surface.

A third aspect of the invention provides a self-sealing fixing element comprising: a body with a bearing surface, a bore which runs along an axis to an opening in the bearing surface, the bore having a bore wall with a frustoconical surface which runs at an oblique angle to the axis; and a deformable sealing ring which is fitted into the bore and contacts the frustoconical surface of the bore wall, wherein the sealing ring is formed of a deformable material which can deform to form a seal.

The fixing element of the third aspect may be provided on its own, as an element of a self-sealing fastener assembly, or as an element of a kit of parts which can be assembled to form such a self-sealing fastener assembly. The assembly typically comprises a bolt with a head, and a shank extending from the head; and the self-sealing fixing element is fitted to the bolt with the shank in the bore.

Optionally the assembly is installed on a structure by passing the tail of the shank through the structure; fitting the self-sealing fixing element to the bolt with the shank in the bore; and urging the bearing surface towards the structure so that the frustoconical surface generates a force which encourages the sealing ring to flow towards the shank and form a seal with the shank.

Any of the optional, or desirable, features discussed above or below in relation to any of the aspects of the invention may be applied to any other aspect, either individually or in any combination.

BRIEF DESCRIPTION OF THE DRAWINGS

Embodiments of the invention will now be described with reference to the accompanying drawings, in which:

FIG. 2 is a side view of a self-sealing nut;

FIG. 3 is an enlarged sectional view of part of the joint of FIG. 1;

FIG. 6-8 are sectional views of an alternative self-sealing nut being installed;

FIG. 11b is an enlarged sectional view of part of an alternative fitting for the kit FIG. 11a;

DETAILED DESCRIPTION OF EMBODIMENT(S)

Figure 1:
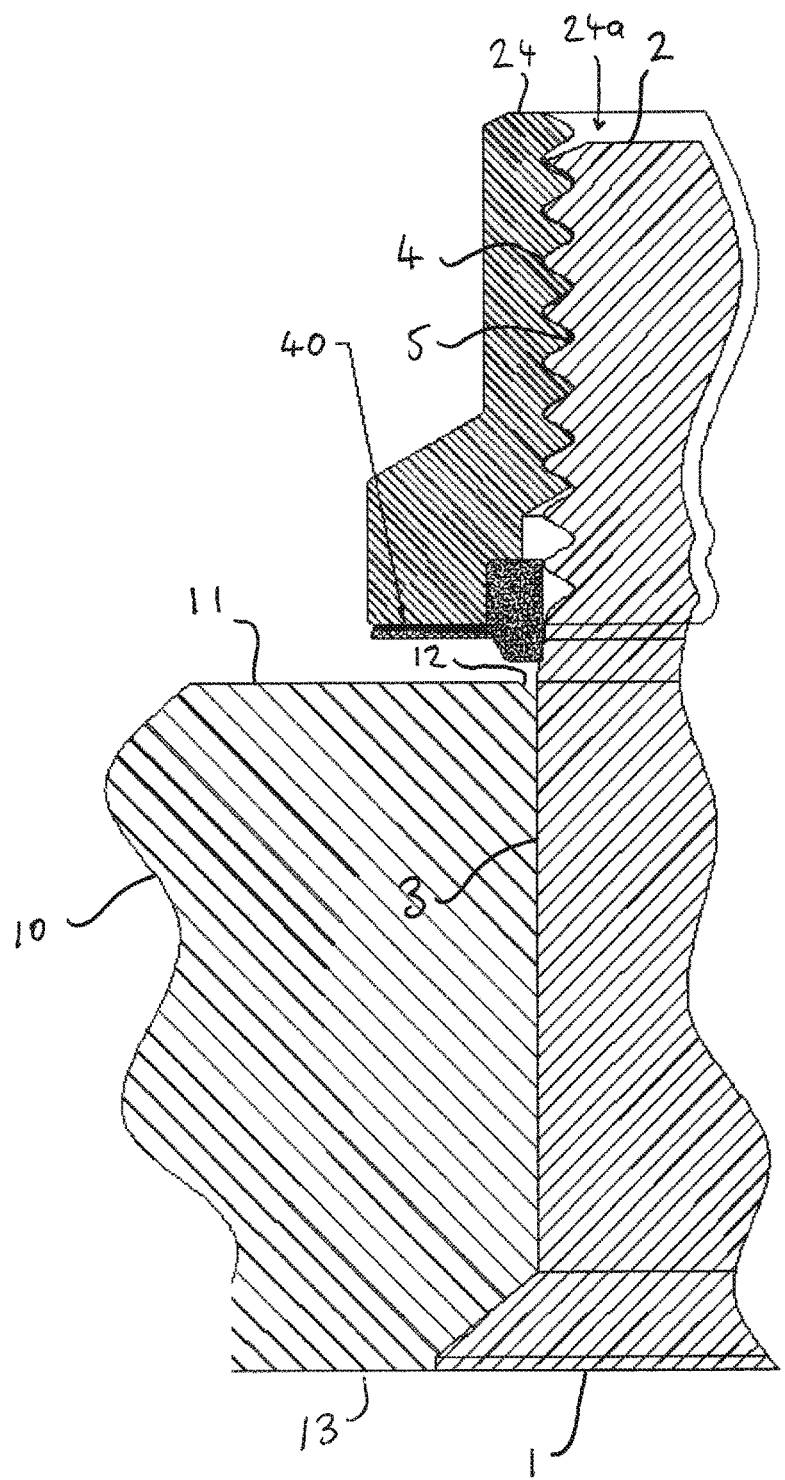
FIG. 1 is a sectional view of a fastener assembly being installed on a structure.

FIG. 1 shows a self-sealing fastener assembly being installed to form a joint with a structure 10. The fastener assembly comprises a bolt with a countersunk head 1 and a shank extending from the head to a tail 2. The shank has an unthreaded portion 3 running from the head 1 along about half the length of the shank, and a threaded portion running from the unthreaded portion to the tail 2. The threaded portion is formed with a helical thread comprising ridges 4 and grooves 5.

The structure 10 may be, for example, an overlapping pair of panels forming the skin of an aircraft wing. Air flows over the outer surface 13 of the outer panel so the head 1 lies flush with the surface 13 to minimise drag. Fuel is housed inside the aircraft wing in contact with the inner surface 11 of the inner panel, so the joint must be liquid-tight.

The bolt is provided as a kit of parts with a self-sealing nut 20 shown in FIG. 2. The nut comprises a body with a hexagonal crown 21 and a skirt 22. The crown 21 has a planar upper non-bearing surface 24 and the skirt has a planar lower bearing surface 23 opposite the non-bearing surface 24. Both surfaces 23, 24 lie perpendicular to a nut axis 35 shown in FIG. 2.

A bore passes through the body of the nut, running along the nut axis 35. The bore has an opening 23a in the bearing surface and an opening 24a in the non-bearing surface. The bore has a bore wall formed with a helical thread comprising ridges 25 and grooves 26. The assembly is installed by passing the tail 2 of the shank through the structure 10 as shown in FIG. 1, then screwing the nut 20 onto the bolt with the tail 2 of the shank in the bore of the nut as shown in FIG. 1.

As shown in FIG. 3, a curable sealant layer 40 is carried by the bearing surface 23 and encircles the opening 23a in the bearing surface. A barrier coating 41 overlays the curable sealant layer 40. The nut axis 35 defines an axial direction A parallel to the nut axis 35 and a radial direction R perpendicular to the nut axis 35. The curable sealant layer 40 extends in the radial direction R away from the bore from an inner edge to an outer edge, and similarly the barrier coating 41 extends in the radial direction R away from the bore from an inner edge to an outer edge. The outer edge of the barrier coating 42 is formed with a flange 50 which overlays the outer edge of the curable sealant layer 40 so that the curable sealant layer is completely encased by the barrier coating 42 and protected from moisture ingress from the atmosphere.

The sealant layer 40 is formed from a one-part moisture-curable sealant material formulated to react with atmospheric moisture to form a cured polymer layer. Various suitable types of sealant material are described in U.S. Pat. No. 8,092,128, the contents of which are incorporated herein by reference. By way of example the sealant material may be a polysulphide or polythioether sealant material which is cure-blocked with a moisture removable blocking group such as a silyl group which hydrolyzes in the presence of moisture to form a thiol group.

The sealant layer 40 is first applied to the bearing surface, and then it is coated with the barrier coating 41 which provides a moisture barrier preventing the sealant material from curing due to ingress of atmospheric moisture. The barrier coating 41 is formed from a barrier material (such as a varnish or resin) which is brittle or frangible so that it will break apart on installation to expose the sealant material to atmospheric moisture. Various suitable types of barrier material are described in U.S. Pat. No. 8,092,128, the contents of which are incorporated herein by reference. By way of example the barrier material may be Cloisite® nanoclay commercially available from Southern Clay Products, Inc. Alternatively the barrier material may be a UV curable or visible light (actinic radiation curable) curable polymer nanocomposite composition comprising an acid ester, an acrylic oligomer, a multi-functional (meth) acrylic monomer, and a layered inorganic silicate.

The bore of the nut is formed with a pair of recesses: an inner recess 27 with a frustoconical base 28 which extends at an oblique angle to the axis 35 and a cylindrical side wall 29 which extends parallel to the axis 35; and an outer counterbore recess with a base 30 which extends perpendicular angle to the axis 35 and a cylindrical side wall 31 which extends parallel to the axis 35. A sealing ring 32 is fitted into the counterbore recess 30, 31. The sealing ring 32 protrudes out of the opening 23*a* of the bore beyond the plane of the bearing surface 23 to a tip 35. The sealing ring has a cylindrical inner face 34, and an outer face with a chamfered edge 33. The outer face of the sealing ring 32 contacts the inner edges of the curable layer 40 and the barrier coating 41 as shown in FIG. 3.

The sealing ring 32 may be secured to the nut by providing an interference fit between the sealing ring 32 and the counterbore recess 30, 31, by providing a reverse taper which mechanically locks the sealing ring 32 in the counterbore recess 30, 31, and/or by bonding.

Figure 4:
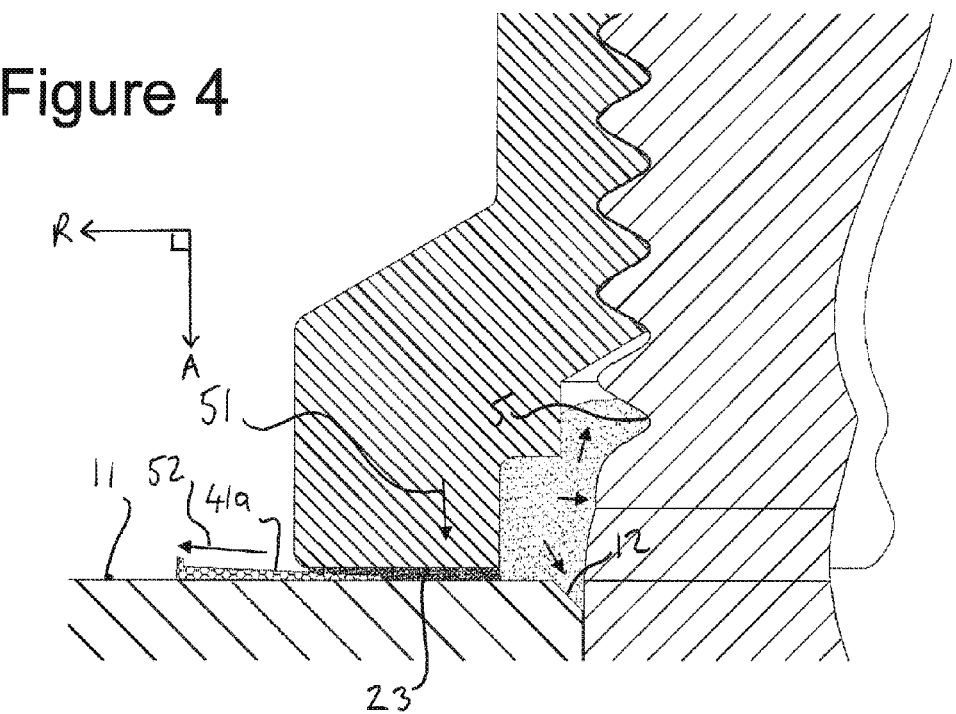
FIG. 4 is an enlarged sectional view of the self-sealing nut being urged towards the structure.
Figure 5:
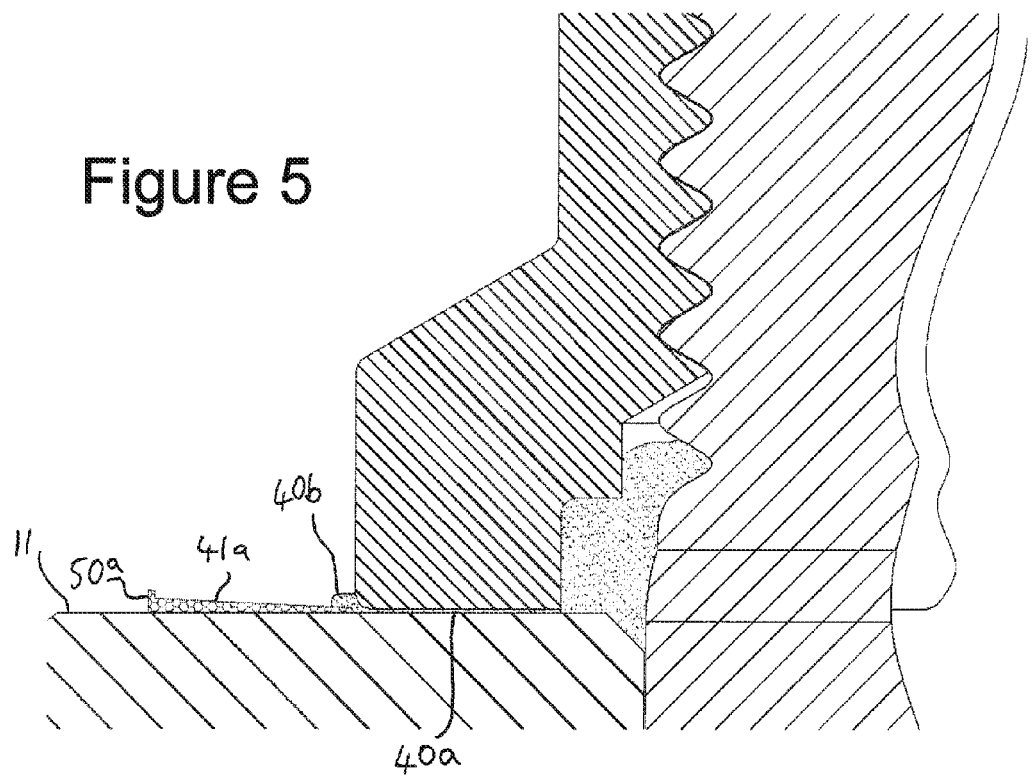
FIG. 5 is a sectional view of the final joint.

FIGS. 1 and 3 show an initial stage of the installation of the fixing element, and subsequent stages are shown in FIGS. 4 and 5. As the nut is screwed onto the shank, the tip 35 of the sealing ring first engages the structure. The sealing ring 32 is formed of a semi rigid but conformable material such as polytetrafluoroethylene (PTFE) which deforms as indicated by the arrows in FIG. 4 and flows into the first recess 5 of the thread and also into a frustoconical recess 12 at the opening of the bore of the structure 10.

As the nut is screwed further, the bearing surface 23 is urged towards the structure in the axial direction A as indicated by arrow 51 in FIG. 4, so that the barrier coating 41 and the curable sealant layer 40 are compressed between the bearing surface 23 and the planar inner surface 11 of the structure, and a clamping force is applied to the structure. The barrier coating 41 then breaks apart to form a series of fragments, one of such fragments being shown in FIGS. 4 and 5 and labelled 41*a*, 50*a*.

Returning to FIG. 3—the curable sealant layer 40 has a thickness which decreases in the radial direction R away from the bore, and the barrier coating 41 has a thickness which increases in the radial direction R away from the bore—in other words they taper in opposite senses and contact each other via respective frustoconical surfaces. The angles of taper are the same so that the barrier coating 41 and the curable sealant layer 40 have a combined thickness which remains substantially constant in the radial direction R away from the bore, and the outer surface 42 of the barrier coating 41 lies parallel with the bearing surface 23 and perpendicular to the nut axis 35. This conical geometry generates an ejection force 52 (shown in FIG. 4) which urges the fragments 41*a*, 50*a* of the barrier coating outwardly as shown in FIGS. 4 and 5 so that they slide off the sealant layer 40 and are ejected to the outside of the skirt 22.

When the barrier coating 41 breaks apart, the sealant layer becomes exposed to atmospheric moisture which initiates cure of the sealant material. As the nut is screwed further, the sealant material of the curable sealant layer flows and then cures to form a thin interfay layer 40*a* between the bearing surface 23 and the surface 11 of the structure as shown in FIG. 5. The interfay layer 40*a* fills any scratches, defects or undulations in the bearing surface 23 or the surface 11. An external extruded bead 40*b* also forms as shown in FIG. 5. Thus in the finished joint shown in FIG. 5, the deformed sealing ring 32 forms a seal between the nut and the threaded portion of the shank of the bolt, and the interfay layer 40*a* forms a seal between the nut and the surface 11.

The sealing ring 32 prevents fuel from flowing into the interface between the shank and the workpiece, and also prevents the sealant material from flowing radially inwardly into contact with the shank.

The interfay layer 40*a* perform a number of useful functions. Firstly it electrically isolates the bearing surface 23 from the inner surface 11 of the structure, providing an element of protection from lightning strike. Secondly it seals the interface between the surfaces 23, 11, preventing fuel or gas from flowing between them. Thirdly it protects the surface 11 from becoming scratched by the bearing surface 23 as the nut is tightened. Fourthly, it prevents galvanic corrosion between the fastener and any exposed aluminium panel that might be present.

As can be seen in FIG. 1, the outer diameter of the unthreaded portion 3 of the shank is slightly greater than the outer diameter of the threaded portion of the shank. In an alternative joint (not shown) an oversized shank and corresponding enlarged hole in the structure may be used in which the outer diameter of the threaded portion of the shank is the same as in FIG. 1, but the outer diameter of the unthreaded portion 3 of the shank is much greater. Such an oversized shank may be used to repair or replace a fastener with a standard shank. In this case the counterbore 30, 31 at the mouth of the bore can accommodate the increased outer diameter of the unthreaded portion 3 of the shank.

FIGS. 6-8 show the installation of a fastener assembly which is similar to the assembly shown in FIGS. 1-5, and equivalent parts are indicated by the same reference numeral incremented by 100. The sealant layer 140 and barrier coating 141 have a larger thickness and a smaller radial width than the sealant layer 40 and barrier coating 41 of FIG. 1. Also the chamfered edge 133 of the sealing ring 132 runs at an increased oblique angle of about 45° to the nut axis, in contrast with the chamfered edge 33 of the sealing ring 32 which runs at an oblique angle of only about 30° to the nut axis. The chamfered edge 133 of the sealing ring bears against a similarly obliquely angled inner edge 145 of the sealant layer 140. This greater angle of attack causes the sealing ring 132 to apply a greater radial ejection force to the sealant layer 140 than in the embodiment of FIGS. 1-5, which improves sealant flow and decoupling and ejection of the barrier coating.

Figure 9:
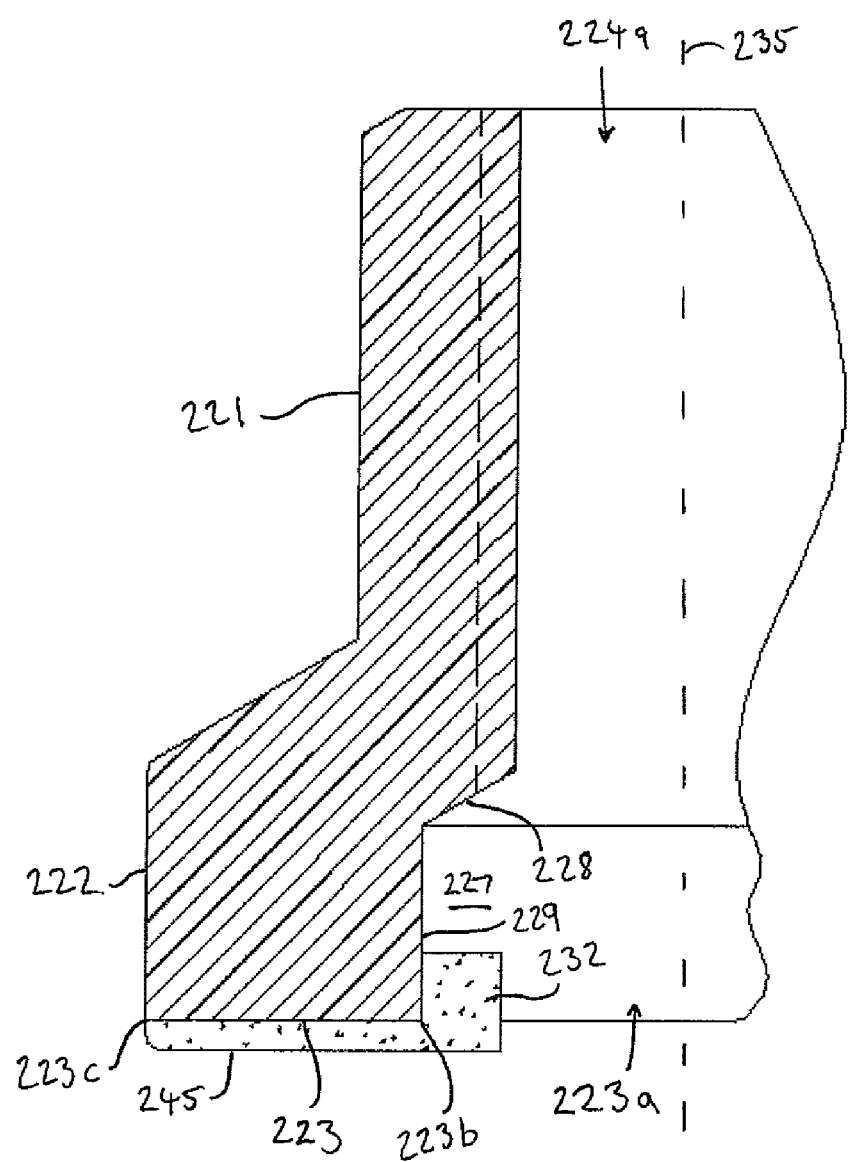
FIG. 9 is a sectional view of an alternative self-sealing nut.

FIG. 9 shows a self-sealing nut similar to the nut shown in FIGS. 1-5, and equivalent parts are indicated by the same reference numeral incremented by 200. Rather than having two recesses, the bore is formed with only a single recess 227 with a frustoconical base 228 which extends at an oblique angle to the nut axis 235 and a cylindrical side wall 229 which extends parallel to the nut axis 235 all the way to the bearing surface 223 which it meets at its inner periphery 223*b*.

A fitting 245, 232 is mounted to the body of the nut. The fitting comprises a washer 245 which contacts the bearing surface 223 and encircles the lower opening 223*a* of the bore, and a sealing flange 232 which protrudes into the recess 227 from an inner diameter of the washer 245.

The washer 245 and the sealing flange 232 are formed integrally from the same material (such as PTFE) which is both compliant so it can deform to form a seal with the shank, and also electrically insulating to electrically isolate the bearing surface 223, thereby preventing electrical current from flowing between the bearing surface 223 and the structure and providing an element of protection from lightning strike.

Forming the washer 245 and the sealing flange 232 as a single part enables them to be easily mounted to the body of the nut at the same time by pushing the sealing flange 232 into the recess 227 until the washer 245 contacts the bearing surface 223.

The fitting 245, 232 may be secured to the nut by providing an interference fit between the sealing flange 232 and the recess 227, by providing a reverse taper which mechanically locks the sealing flange 232 in the recess 227, and/or by bonding.

The bearing surface 223 extends radially outwardly from an inner periphery 223b where it meets the opening of the bore to an outer periphery 223c, and the washer 245 contacts the bearing surface substantially all the way from its inner periphery 223b to its outer periphery 223c.

As the bearing surface 223 is urged towards the structure, the washer 245 is compressed between the bearing surface 223 and the structure, and the sealing flange 232 deforms to form a seal with the thread of the shank.

The recess 227 at the mouth of the bore can accommodate the increased outer diameter of the unthreaded portion of an oversized shank.

Figure 10:
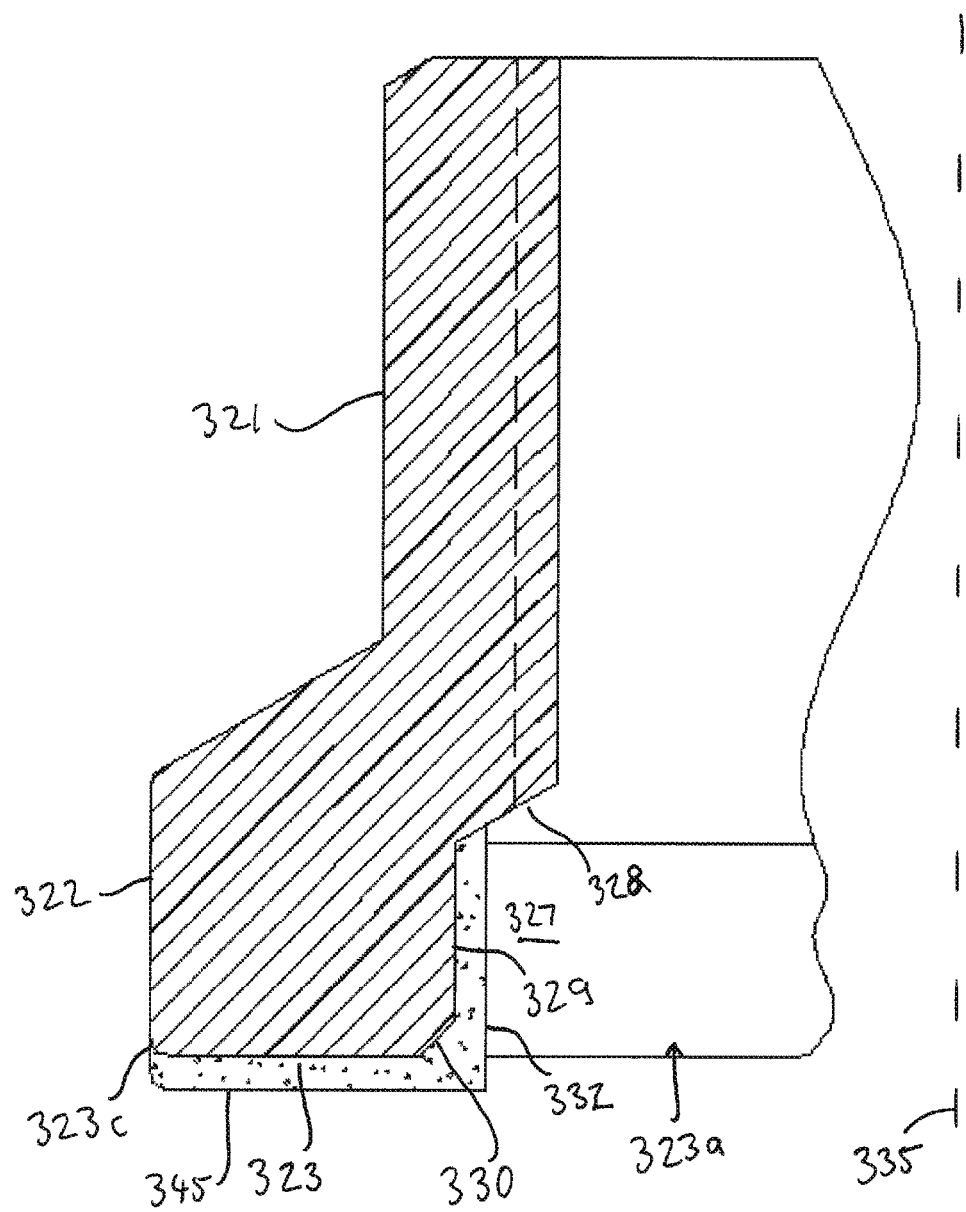
FIG. 10 is a sectional view of a further alternative self-sealing nut.

FIG. 10 shows a self-sealing nut similar to the nut shown in FIG. 9, and equivalent parts are indicated by the same reference numeral incremented by 100. The bore is formed with a single recess 327 with a frustoconical base 328 which extends at an oblique angle to the axis, and a cylindrical side wall 329 which extends parallel to the axis all the way to a frustoconical chamfered edge 330 where it meets the bearing surface 323. Unlike the sealing flange 232 of FIG. 9, which extends only part of the depth of the recess 227, the sealing flange 332 of the fitting of FIG. 10 extends the full depth of the recess 327 and contacts the frustoconical base 328. As with the previous embodiment, the recess 327 can accommodate the increased outer diameter of the unthreaded portion of an oversized shank.

Unlike the previous embodiments, the bore has a bore wall with a pair of frustoconical surfaces 328, 330 which each run at an oblique angle to the nut axis 335. The frustoconical chamfered edge 330 extends at an oblique angle of about 45° to the nut axis 335, and generates a force which encourages the sealing flange 332 to flow into the thread of the shank to form a seal. Similarly the frustoconical base 328 extends at an oblique angle of about 60° to the nut axis 335, and also generates a force which encourages the sealing flange 332 to flow into the thread of the shank to form a seal.

The fitting 345, 332 may be secured to the nut by providing an interference fit between the sealing flange 332 and the recess 327, by providing a reverse taper which mechanically locks the sealing flange 332 in the recess 327, and/or by bonding.

Figure 11A:
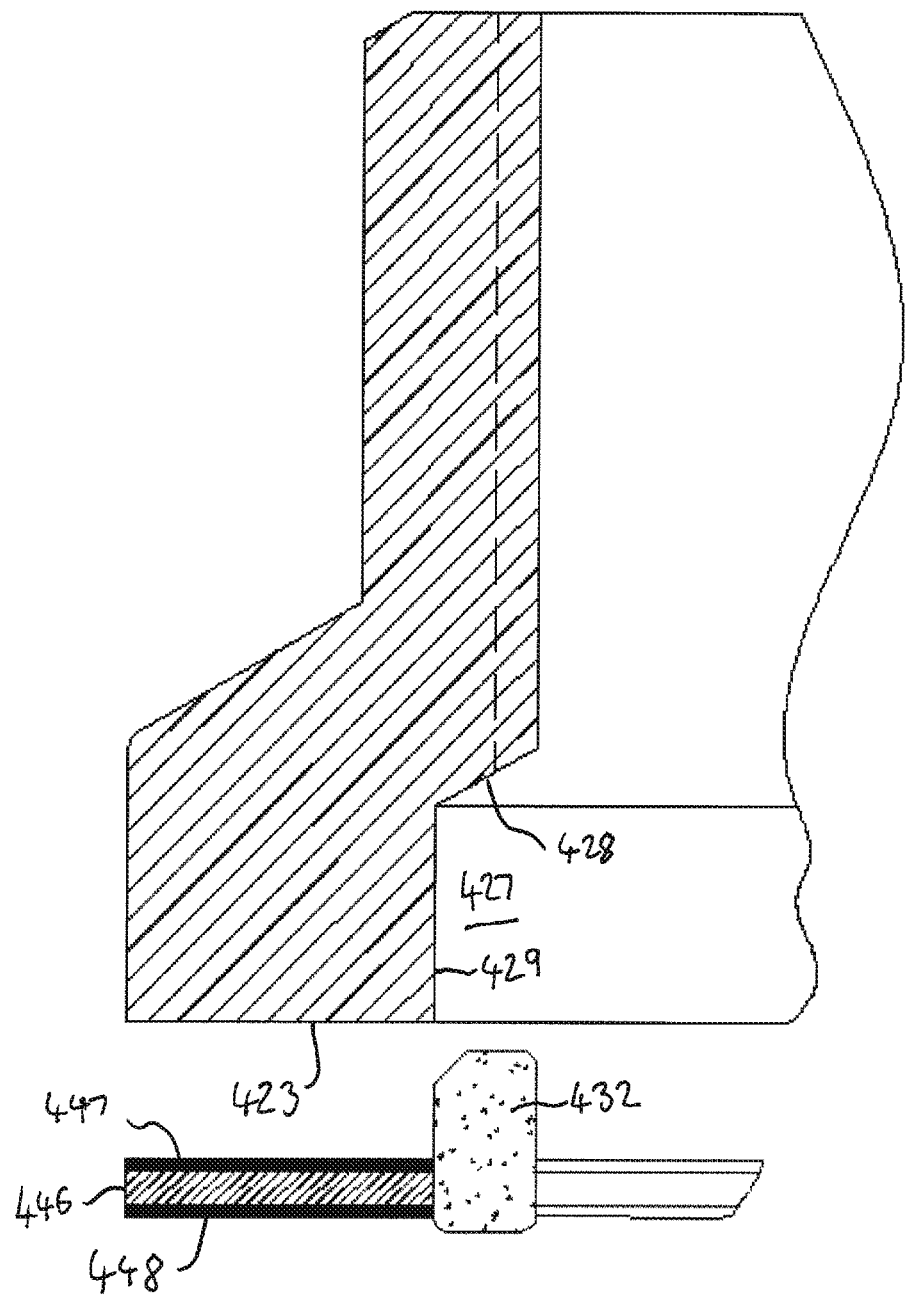
FIG. 11a is a sectional view of a kit of parts for forming a further alternative self-sealing nut.

FIG. 11a shows a kit of parts which can be assembled to form a self-sealing nut similar to the nut shown in FIG. 9, and equivalent parts are indicated by the same reference numeral incremented by 200. Unlike FIGS. 9 and 10, the nut is shown as a kit of parts in its un-assembled state before the fitting is mounted to the body of the nut. The washer of the fitting comprises an electrically conductive metal ring 446 coated with electrically insulating layers 447, 448 formed from an electrically insulating ceramic material such as Keronite™. Rather than being formed integrally with the washer 446-448, the sealing flange 432 is formed separately and then mounted to the inner diameter of the metal ring 446 so that the washer 446-448 and sealing flange 432 together form a single fitting as shown in FIG. 11a.

Figure 11B:
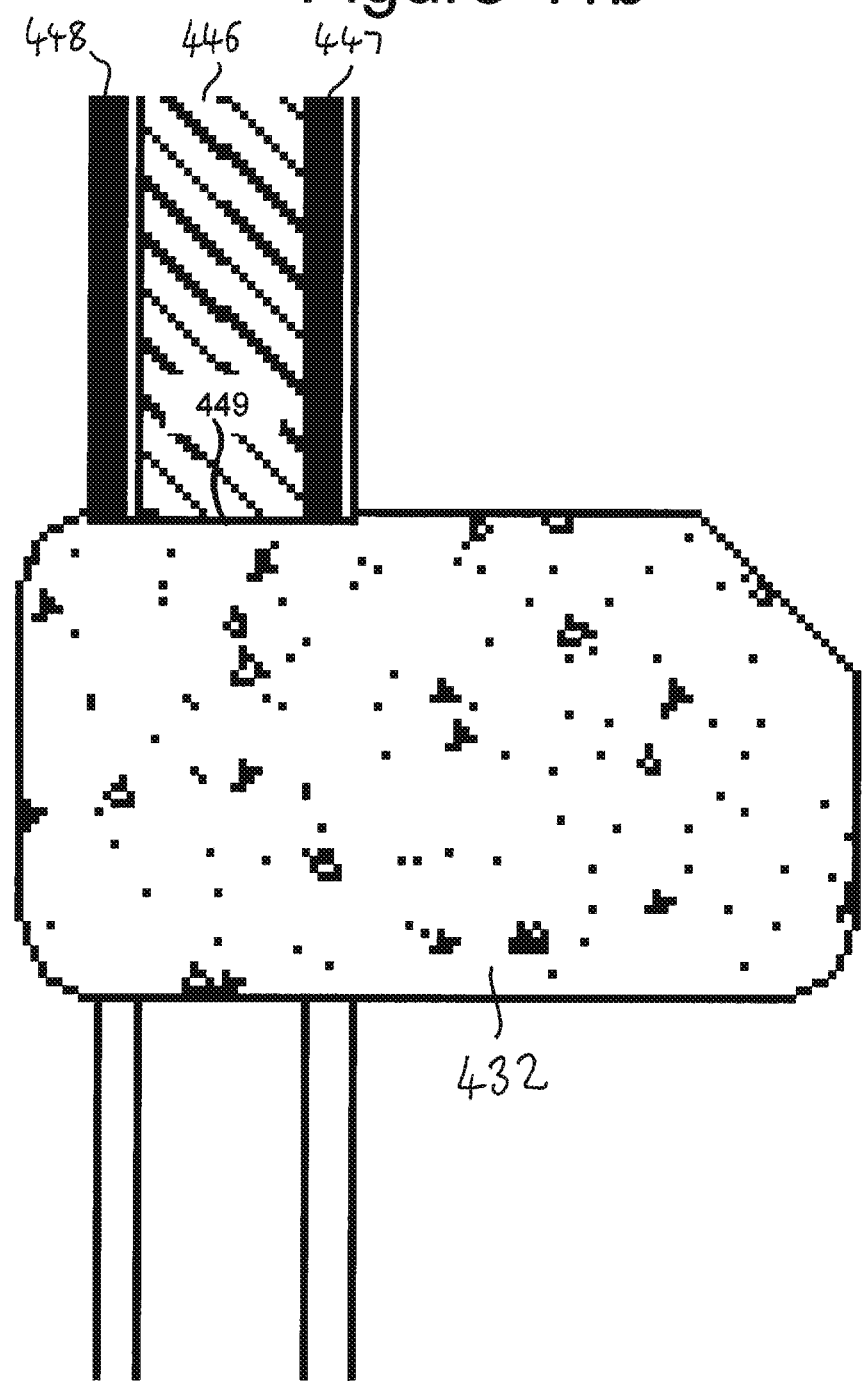

The washer 446-448 and sealing flange 432 may be secured together by bonding, by providing an interference fit between them, or by providing a snap-fit joint between them. FIG. 11b gives an example of such a snap-fit joint. The sealing flange 432 is formed with a shallow annular recess 449 which receives the inner edge of the washer 446-448 as a snap-fit.

Forming the washer 446-448 and the sealing flange 432 as a single part enables them to be easily mounted to the body of the nut at the same time by pushing the sealing flange 432 into the recess 427 until the insulating layer 447 contacts the bearing surface 423. The fitting 446-448, 432 may be secured to the nut by providing an interference fit between the sealing flange 432 and the recess 427, by providing a reverse taper which mechanically locks the sealing flange 432 in the recess 427, and/or by bonding.

In its assembled state the washer 446-448 contacts the bearing surface 423 and encircles the opening in the bearing surface, and the deformable sealing flange 432 protrudes into the recess 427 of the bore in a similar manner to the deformable sealing flange 232 of FIG. 9.

The washer 446-448 performs a number of useful functions. Firstly it electrically isolates the bearing surface 423 from the inner surface of the structure, providing an element of protection from lightning strike. Secondly it protects the surface of the structure from becoming scratched by the bearing surface 423 as the nut is tightened. Thirdly, it prevents galvanic corrosion between the fastener and any exposed aluminium panel that might be present.

Figure 12:
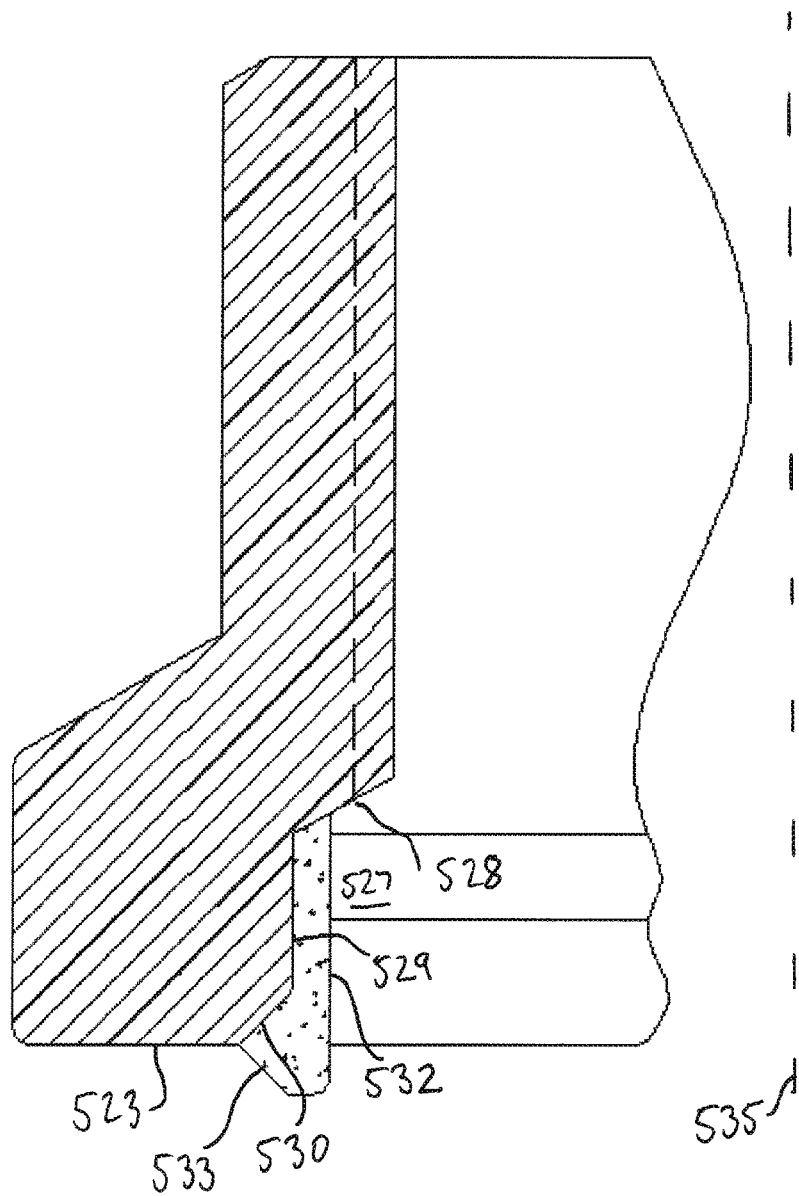
FIGS. 12-16 are sectional views of further alternative self-sealing nuts.

FIG. 12 shows a self-sealing nut similar to the nut shown in FIG. 10, and equivalent parts are indicated by the same reference numeral incremented by 200. The bore is formed with a single recess 527 with a frustoconical base 528 which extends at an oblique angle to the nut axis 535, and a cylindrical side wall 529 which extends parallel to the nut axis all the way to a frustoconical chamfered edge 530 where it meets the bearing surface 523.

Unlike the sealing flange 232 of the fitting of FIG. 9, which extends into only part of the depth of the recess 227, the sealing ring 532 extends the full depth of the recess 527 and contacts the frustoconical base 528.

Unlike the embodiments of FIGS. 9-11, no washer is provided to electrically isolate the bearing surface 523. The sealing ring 532 has an enlarged protruding tip which contacts the chamfered edge 530, and a chamfered edge 533 similar to the chamfered edge 33 of the sealing flange 32.

Like the embodiment of FIG. 10, the bore has a bore wall with a pair of frustoconical surfaces 528, 530 which each run at an oblique angle to the nut axis 535. The frustoconical chamfered edge 530 extends at an oblique angle of about 45° to the nut axis 535, and generates a force which encourages the sealing ring 532 to flow into the thread of the shank to form a seal. Similarly the frustoconical base 528 extends at an oblique angle of about 60° to the nut axis 535, and also generates a force which encourages the sealing ring 532 to flow into the thread of the shank to form a seal.

Figure 13:
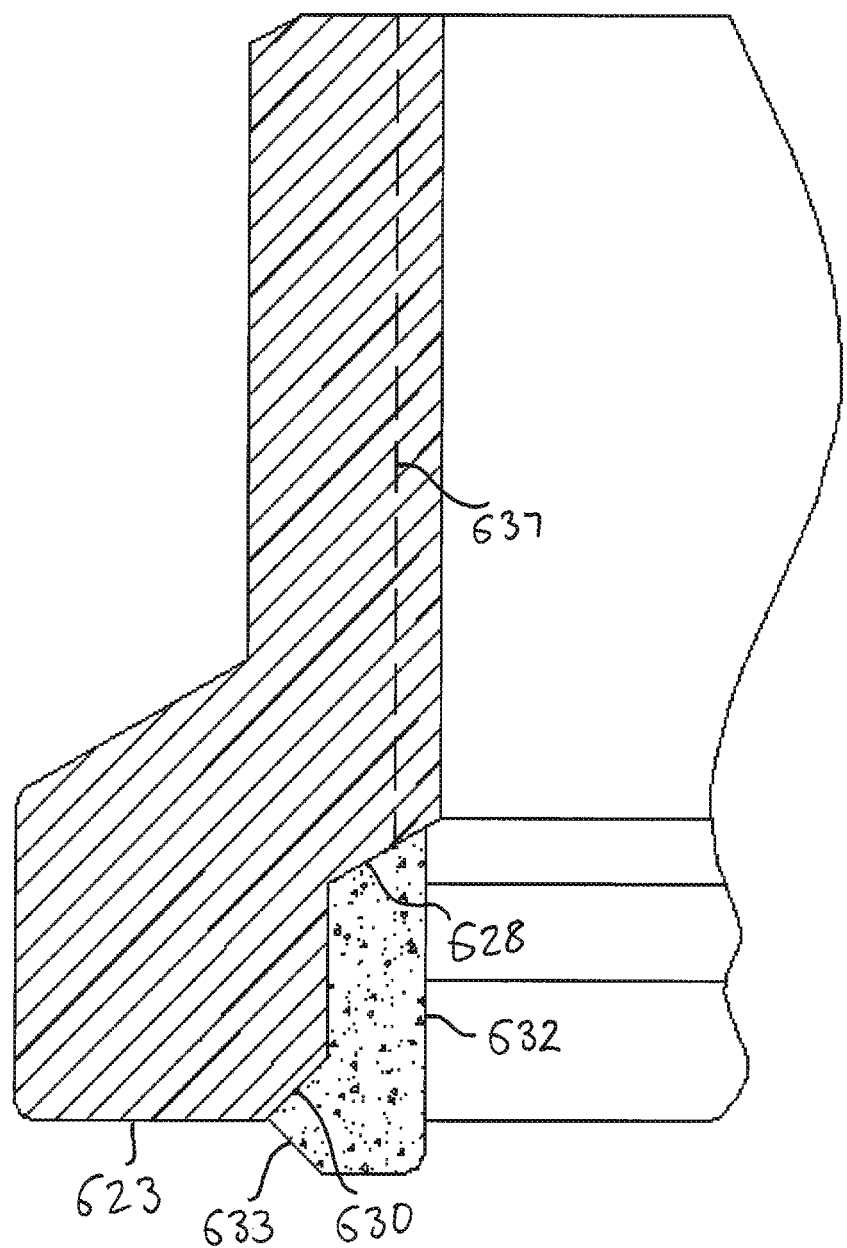

FIG. 13 shows a self-sealing nut similar to the nut shown in FIG. 12, and equivalent parts are indicated by the same reference numeral incremented by 100. The bore is formed with a single recess with a frustoconical base 628 which extends at an oblique angle to the nut axis, and a cylindrical side wall which extends parallel to the nut axis all the way to a frustoconical chamfered edge 630 where it meets the bearing surface 623.

The sealing ring 632 has a smaller inner diameter than the sealing ring 532 of FIG. 12. The inner diameter of the sealing ring 632 is also smaller than the outer diameter 637 of the thread, so the sealing ring 632 interferes with the threads of the shank as the nut is screwed onto the shank.

Figure 14:
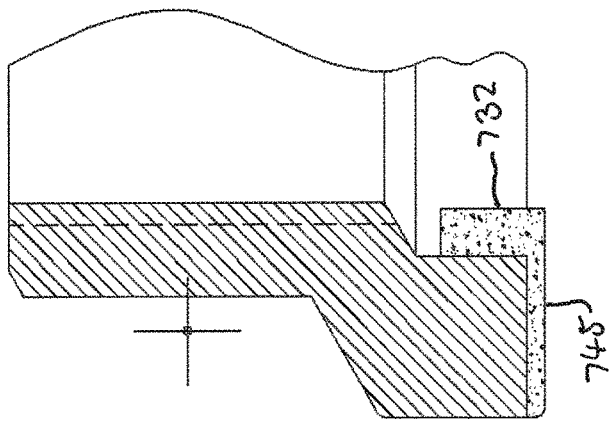

FIG. 14 shows a self-sealing nut similar to the nut shown in FIG. 9, and equivalent parts are indicated by the same reference numeral incremented by 500. The sealing flange 732 of FIG. 14 has a greater axial depth than the sealing flange 232 of FIG. 9.

Figure 15:
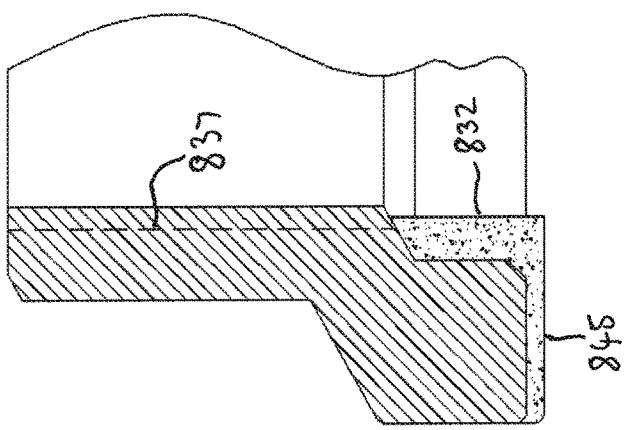

FIG. 15 shows a self-sealing nut similar to the nut shown in FIG. 10, and equivalent parts are indicated by the same reference numeral incremented by 500. The sealing flange 832 of FIG. 15 has a smaller inner diameter than the sealing flange 332 of FIG. 10. The inner diameter of the sealing flange 832 is also smaller than the outer diameter 837 of the thread, so the sealing flange 832 interferes with the threads of the shank as the nut is screwed onto the shank.

Figure 16:
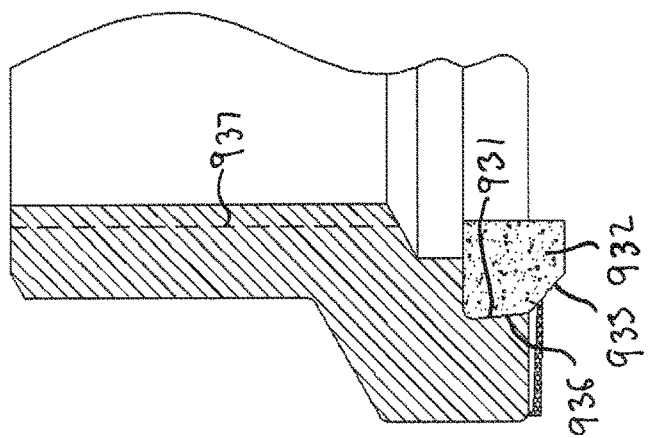

FIG. 16 shows a self-sealing nut similar to the nut shown in FIGS. 1-5, and equivalent parts are indicated by the same reference numeral incremented by 900. The inner diameter of the sealing ring 932 is smaller than the outer diameter 937 of the thread, so the sealing ring 932 interferes with the threads of the shank as the nut is screwed onto the shank.

The sealing ring 932 has a chamfered edge 933 like the chamfered edge 33 of FIG. 3, and the side wall 931 of the recess in the mouth of the bore has a reverse taper which engages a tapered face 936 of the sealing ring to mechanically lock the sealing ring 932 in the recess.

Figure 17:
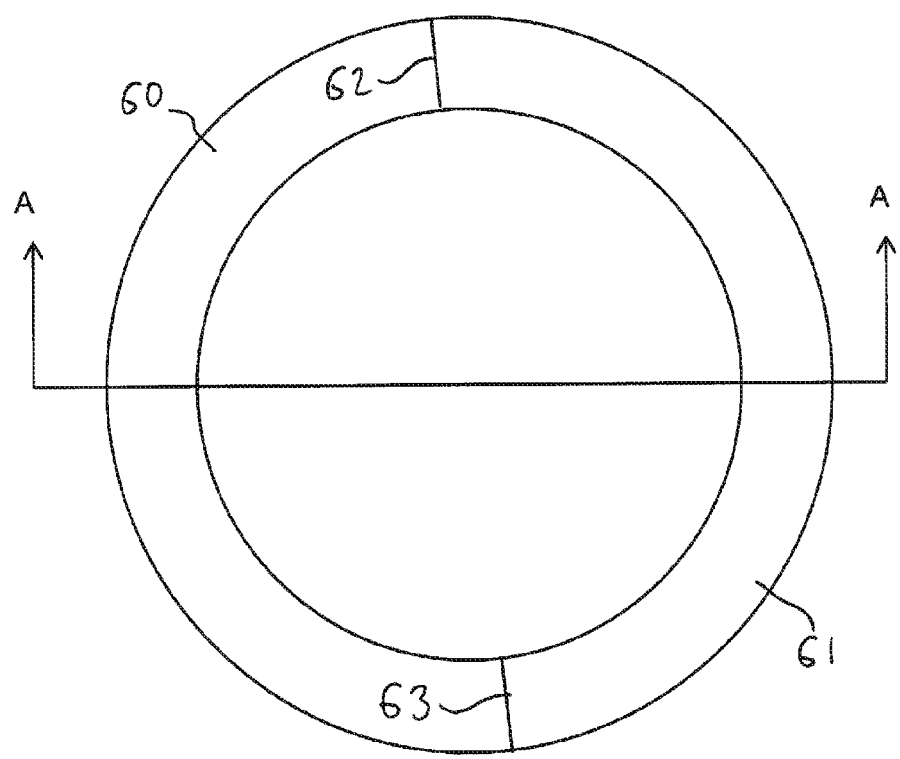
FIG. 17 is a plan view of an alternative barrier layer.
Figure 18:
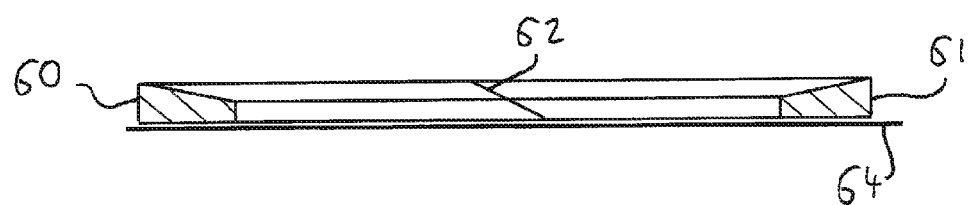
FIG. 18 is a sectional view of the barrier layer of FIG. 17 taken along a line A-A.

FIGS. 17 and 18 show an alternative barrier layer which can be substituted for the barrier coating 41 in the embodiment of FIGS. 1-5. In the embodiment of FIG. 1-5 the barrier coating 41 is formed from a frangible material, so that before it slides off the sealant layer 40 it is broken apart into fragments as it is compressed between the bearing surface and the structure. In the embodiment of FIGS. 17 and 18 the barrier coating is formed as two semi-circular segments 60, 61 which can slide off the sealant layer without first breaking apart. In this cases the segments 60, 61 are made from a tough non-frangible material which resists fracture to prevent contamination of the sealant layer with fractured pieces. The segments 60, 61 are in contact at a pair of split planes 62, 63 which may lie at an oblique angle to the nut axis as shown in FIG. 18, or may lie parallel to the nut axis depending on the viscosity of the sealant and the amount of load required to separate the segments apart. Optionally the segments 60, 61 are coated at their edges where they meet at the split planes 62, 63 in a low friction material such as PTFE to promote slippage.

A removable semi-adhesive layer 64 is applied to the lower surface of the barrier layer to keep the segments 60, 61 in position and keep the moisture barrier in place before installation. This layer 64 is peeled off before the nut is fitted onto the shank, or after the nut has been fitted onto the shank but before it contacts the structure 11. The layer 64 is optional and may be omitted if it is not required.

In the embodiments of the invention described in FIGS. 1-18, the bolt is secured to the structure by an internally threaded nut, but in alternative embodiments of the invention a swage collar may be used instead to secure the bolt to the structure. A swage collar is urged towards the structure by a swage tool without rotating. Nuts and swage collars perform the same function, but nuts tend to be used where there is insufficient access for the swage tool or there is a preference for nuts. Swage fixing elements are lighter and apply more predictable preload to the joint. Swage collars are also less likely to damage the structure as there is no rotation rubbing between the bearing surface and the structure.

Although the invention has been described above with reference to one or more preferred embodiments, it will be appreciated that various changes or modifications may be made without departing from the scope of the invention as defined in the appended claims.

The invention claimed is:

1. A self-sealing fixing element comprising a body with a bearing surface, and a bore with an opening in the bearing surface; a curable sealant layer which is carried by the bearing surface and encircles the opening in the bearing surface, wherein the curable sealant layer is formed from a sealant material which cures when exposed to atmosphere; and a barrier layer which overlays the curable sealant layer and can slide off the sealant layer when the fixing element is installed in order to expose the sealant layer to atmosphere, wherein the curable sealant layer has a thickness which decreases away from the bore, and the barrier layer has a thickness which increases away from the bore.

2. The fixing element of claim 1 wherein the barrier layer and the curable sealant layer have a combined thickness which remains substantially constant away from the bore.

3. The fixing element of claim 1 wherein the fixing element is a nut, and the bore has a threaded bore wall.

4. The fixing element of claim 1 further comprising a deformable sealing ring fitted into the bore, wherein the sealing ring is formed of a deformable material which can deform to form a seal when the fixing element is installed.

5. The fixing element of claim 4 wherein the bore is formed with a recess at the opening in the bearing surface, and the sealing ring is fitted into the recess.

6. The fixing element of claim 4 wherein the sealing ring contacts an inner edge of the barrier layer.

7. The fixing element of claim 4 wherein the sealing ring bears against an inner edge of the sealant layer.

8. The fixing element of claim 7 wherein the bore runs along an axis, and the sealing ring bears against an inner edge of the sealant layer which runs at an oblique angle to the axis.

9. The fixing element of claim 1 wherein the barrier layer is formed as a coating of frangible material, so that it fractures into fragments as it is compressed between the bearing surface and the structure.

10. The fixing element of claim 1 wherein the barrier layer is formed as two or more segments which can slide off the sealant layer without first fracturing into fragments.

11. A self-sealing fastener assembly comprising: a bolt with a head, and a shank extending from the head; and a self-sealing fixing element according to claim 1 which is fitted to the bolt with the shank in the bore.

12. A kit of parts which can be assembled to form the self-sealing fastener assembly of claim 11, the kit of parts comprising: a bolt with a head, and a shank extending from the head; and a self-sealing fixing element comprising a body with a bearing surface, and a bore with an opening in the bearing surface; a curable sealant layer which is carried by the bearing surface and encircles the opening in the bearing surface, wherein the curable sealant layer is formed from a sealant material which cures when exposed to atmosphere; and a barrier layer which overlays the curable sealant layer and can slide off the sealant layer when the fixing element is installed in order to expose the sealant layer to atmosphere, wherein the curable sealant layer has a thickness which decreases away from the bore, and the barrier layer has a thickness which increases away from the bore, wherein the self-sealing fixing element can be fitted to the bolt with the shank in the bore.

13. A method of installing a self-sealing fastener assembly, the method comprising providing a kit of parts according to claim 12; passing the shank through a structure; fitting the self-sealing fixing element to the bolt with the shank in the bore; urging the bearing surface towards the structure so that the barrier layer and the curable sealant layer are compressed between the bearing surface and the structure, the barrier layer slides off the sealant layer and is ejected away from the bore, and the curable sealant layer flows and then cures to form a seal between the bearing surface and the structure.

14. A self-sealing fixing element comprising:
a body with a bearing surface, and a bore with an opening in the bearing surface; and
a fitting comprising a washer which contacts the bearing surface and encircles the opening in the bearing surface, wherein the washer is formed of an insulating material which electrically isolates the bearing surface, and a deformable sealing flange which protrudes into the bore from an inner diameter of the washer, wherein the sealing flange is formed of a deformable material which can deform to form a seal, and wherein the deformable sealing flange and the washer are made from different materials, wherein the bearing surface extends radially outwardly from an inner periphery where it meets the opening to an outer periphery, and the washer contacts the bearing surface from its inner periphery to its outer periphery.

15. The fixing element of claim 14 wherein the washer is bonded to the bearing surface.

16. The fixing element of claim 14 wherein the washer comprises a metal ring with an insulating coating which contacts the bearing surface.

17. The fixing element of claim 14 wherein the sealing flange is joined or integrally formed with the inner diameter of the washer so that the washer and sealing flange form a single part.

18. The fixing element of claim 14 wherein the bore is formed with a recess at the opening in the bearing surface, and the sealing flange is fitted into the recess.

19. A method of assembling the fixing element of claim 14, the method comprising forming the washer and sealing flange as a single part to form the fitting; and then mounting the fitting to the body by pushing the sealing flange into the bore until the washer contacts the bearing surface.

20. A kit of parts which can be assembled to form the self-sealing fixing element of claim 14 comprising:
a body with a bearing surface, and a bore with an opening in the bearing surface; and
a fitting comprising a washer which can be mounted to the body so that it contacts the bearing surface and encircles the opening in the bearing surface, wherein the washer is formed of an insulating material which can electrically isolate the bearing surface, and a deformable sealing flange which can be mounted to the body so that it protrudes into the bore from an inner diameter of the washer, wherein the sealing flange is formed of a deformable material which can deform to form a seal.

21. A self-sealing fastener assembly comprising: a bolt with a head, and a shank extending from the head to a tail; and a self-sealing fixing element according to claim 14 which is fitted to the bolt with the shank in the bore, wherein the sealing flange is formed of a material which can deform to form a seal with the shank.

22. A kit of parts which can be assembled to form the self-sealing fastener assembly of claim 21, the kit of parts comprising: a bolt with a head, and a shank extending from the head to a tail; and a self-sealing fixing element comprising a body with a bearing surface, and a bore with an opening in the bearing surface; and a fitting comprising a washer which contacts the bearing surface and encircles the opening in the bearing surface, wherein the washer is formed of an insulating material which electrically isolates the bearing surface, and a deformable sealing flange which protrudes into the bore from an inner diameter of the washer, wherein the sealing flange is formed of a deformable material which can deform to form a seal, and wherein the self-sealing fixing element can be fitted to the bolt with the shank in the bore.

23. A method of installing a self-sealing fastener assembly, the method comprising providing a kit of parts according to claim 22; passing the tail of the shank through a structure; fitting the self-sealing fixing element to the bolt with the shank in the bore; and urging the bearing surface towards the structure so that the washer is compressed between the bearing surface and the structure, and the sealing flange deforms to form a seal with the shank.

24. A self-sealing fixing element comprising:
a body with a bearing surface, a bore which runs along an axis to an opening in the bearing surface, the bore having a bore wall with a frustoconical surface which runs at an oblique angle to the axis; and
a deformable sealing ring which is fitted into the bore and contacts the frustoconical surface of the bore wall, wherein the sealing ring is formed of a deformable material which can deform to form a seal, and a washer contacting the bearing surface, wherein the deformable sealing flange and the washer are made from different materials, wherein the frustoconical surface is a chamfered edge where the bore wall meets the bearing surface.

25. A self-sealing fastener assembly comprising: a bolt with a head, and a shank extending from the head to a tail; and a self-sealing fixing element according to claim 24 which is fitted to the bolt with the shank in the bore, wherein the sealing ring is formed of a material which can deform to form a seal with the shank, and the frustoconical surface is arranged to generate a force which encourages the sealing ring to flow towards the shank to form the seal with the shank.

26. A kit of parts which can be assembled to form the self-sealing fastener assembly of claim 25, the kit of parts comprising: a bolt with a head, and a shank extending from the head to a tail; and a self-sealing fixing element comprising a body with a bearing surface, a bore which runs along an axis to an opening in the bearing surface, the bore having a bore wall with a frustoconical surface which runs at an oblique angle to the axis; and a deformable sealing ring which is fitted into the bore and contacts the frustoconical surface of the bore wall, wherein the sealing ring is formed of a deformable material which can deform to form a seal, and wherein the self-sealing fixing element can be fitted to the bolt with the shank in the bore.

27. A method of installing a self-sealing fastener assembly, the method comprising providing a kit of parts according to claim 26; passing the tail of the shank through a structure; fitting the self-sealing fixing element to the bolt with the shank in the bore; and urging the bearing surface towards the structure so that the frustoconical surface generates a force which encourages the sealing ring to flow towards the shank and form a seal with the shank.

* * * * *